No. 856,141. PATENTED JUNE 4, 1907.
W. GRIESSER.
FEED WATER HEATER.
APPLICATION FILED MAR. 9, 1907.
2 SHEETS—SHEET 2.
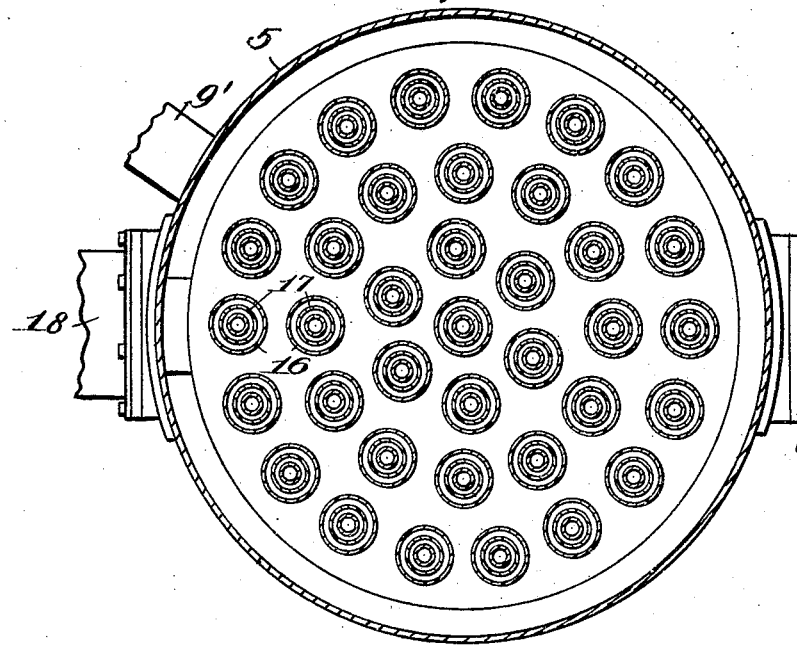
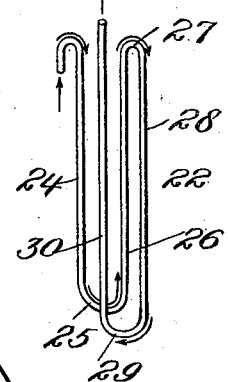
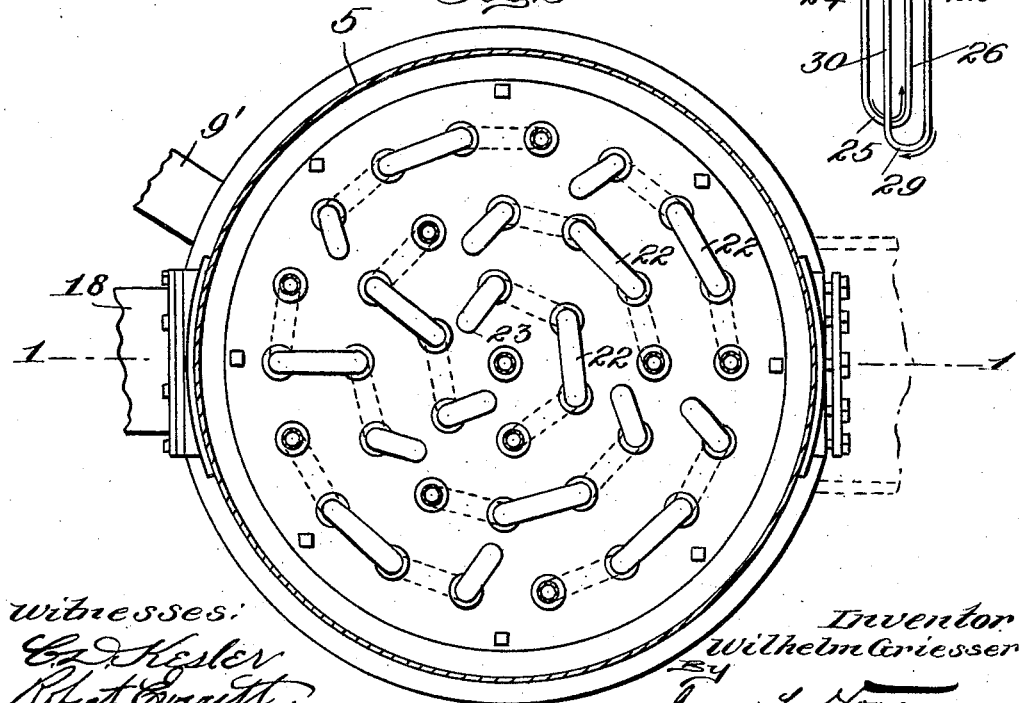

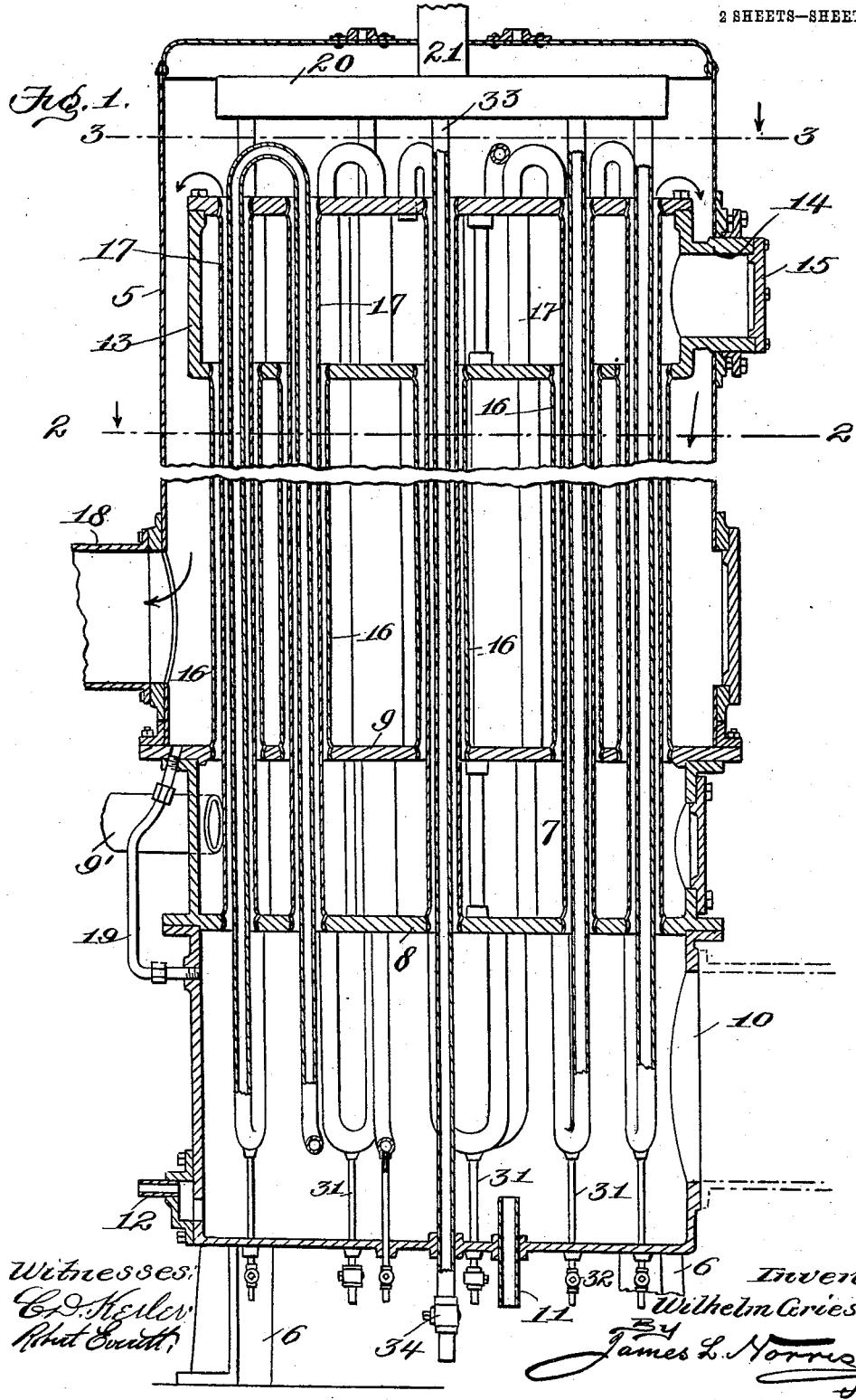

UNITED STATES PATENT OFFICE.

WILHELM GRIESSER, OF PITTSBURG, PENNSYLVANIA, ASSIGNOR TO OLGA KOEHN, DOING BUSINESS UNDER THE NAME OF BREWERY EQUIPMENT & SUPPLY CO., OF NEW YORK, N. Y.

FEED-WATER HEATER.

No. 856,141.   Specification of Letters Patent.   Patented June 4, 1907.

Application filed March 9, 1907. Serial No. 361,541.

*To all whom it may concern:*

Be it known that I, WILHELM GRIESSER, a citizen of the United States, residing at Pittsburg, in the county of Allegheny and State of Pennsylvania, have invented new and useful Improvements in Feed-Water Heaters, of which the following is a specification.

This invention relates to feed water heaters, the object of the invention being to provide a simple and effective device of this character which is adapted for quickly and uniformly heating cold water suitably supplied thereto. The heating agent in the present instance is preferably steam, and I find that I can for this purpose utilize with advantage the exhaust from one or more steam engines which may be supplied with water heated by the apparatus.

In the drawings accompanying and forming part of this specification I show in detail one advantageous form of embodiment of the invention which, to enable those skilled in the art to practice the same, will be fully set forth in the following description, while the novelty of the invention will be included in the claims succeeding said description.

Referring to said drawings: Figure 1 is a vertical sectional elevation of a feed water heater involving my invention. Fig. 2 is a horizontal sectional plan view, the section being on the line 2—2 of Fig. 1. Fig. 3 is a similar view, the section being on the line 3—3 of said Fig. 1. Fig. 4 is a detail view of a coiled member.

Like characters refer to like parts throughout the several figures.

The device includes in its construction a casing such as 5, which casing may be of any desirable shape. The casing may be made from any suitable material; for example, it may consist of metal sections bolted, riveted, or otherwise connected to each other. In the present instance, the casing stands vertically and it may be supported by several legs or standards, as 6, as shown for example in Fig. 1. Within the casing is what I term a cold water chamber 7, the outer wall of which is ordinarily formed by the body of the casing, while the lower and upper heads thereof are shown as consisting of plates 8 and 9 suitably connected at their marginal portions with the body of the casing. The cold water may be supplied to the chamber 7 in any suitable way, for example, by means of the pipe 9' opening into said chamber. The lower head of the chamber 7 is situated above the bottom of the casing 5 and into the space between said head and bottom the steam for heating the water is led, for example, by way of the inlet 10, as shown in Fig. 1. Some of the steam directed into the casing is naturally condensed, and this falls on to the bottom thereof. The condensate usually contains oil, and, for skimming off this oil, I may provide a skimming pipe as 11 extending into the casing 5 through the bottom thereof and up to a suitable level, for example, such as that indicated in Fig. 1. Any oil therefore that is upon the surface of the water enters said skimming pipe 11. The casing 5 may be provided exteriorly near its bottom with a drip connection as 12.

The hot water chamber is designated by 13, and it is located preferably in the casing above the cold water chamber 7. The said hot water chamber 13 is substantially of drum-form and its periphery is separated from the inner surface of the casing 5, the space between the two parts providing for the passage of steam. The hot water chamber 13 may be provided at one side with an outwardly-extending pipe section 14 projecting through the wall of the casing 5 and having a removable cap 15 by which access may be provided to the interior of said hot water chamber to clean the same. As usual in devices of this class, man-holes subserving their customary function may be put wherever desired, several being shown in the drawings. As these in themselves form no part of the invention, it is needless to refer to their particular location or describe the same in detail. The two chambers 7 and 13 communicate, and this communication may be provided in any desirable way, for example, by a series of ducts or pipes as 16 which may be of any desirable number. It is possible that but one of said pipes 16 may be provided, although I prefer to employ a multiplicity thereof so as to provide for the conduct of a number of streams of water from the cold water chamber 7 to the hot water chamber 13. The lower end of each pipe 16 is, in the present instance, connected with the upper head 9 of said cold water chamber, while the upper end thereof is connected with the lower head of the hot water chamber 13. Where requisite I provide steam and water-tight connections, and I deem it unnecessary to refer to these in each instance. It will be understood that the pipes 16 are connected with the hot and cold water chambers in such a way as to prevent entrance of steam from the steam space into either of these chambers or the escape of water from said chambers into the steam space.

I prefer to extend from the lower head of the cold water chamber 7 to the upper head of the hot water chamber 13 conducting means for the steam introduced into the casing, and the same may be of any desirable character. For this purpose I provide pipes as 17 which, in the present instance, correspond in number with and extend entirely through the pipes 16. The pipes 17 are of less diameter than the pipes 16, so that there will be spaces between the respective pipes through which the cold water can flow from the cold toward the hot water chamber, such water, during such flow, being heated by steam traversing said pipe 17 and which enters the latter at the lower ends thereof from the space or compartment below the cold water chamber. The steam first enters the compartment below the chamber 7, rises through the pipes 17 and heats the water in the chamber 7, pipes 16, and chamber 13, while passing through said pipes 17. The steam, after leaving the upper ends of the pipes 17, takes a downward course, circulates round the various pipes, and finally enters the exhaust pipe 18. Any suitable means may be provided for conducting the condensates from the space above the chamber 7 into the space below the same. For this purpose I have shown a bypass pipe 19.

In connection with the hot water chamber 13 I provide coil-pipe means for conducting the hot water away from said hot water chamber and to a suitable receiver such as the manifold 20 mounted in the upper part of the casing 5 and having a pipe 21 leading therefrom and extending through the top of the casing. This pipe 21 may constitute a supply pipe for delivering hot feed water to one or more engines. The coil-pipe means is disposed during its course in the exhaust steam space or compartment below the chamber 7, the steam when it initially enters said coil-pipe means being at its hottest and the water at this time being also hottest. As the steam rises through the apparatus it is cooled and it comes in contact with surfaces which are also cooled. By virtue of this relation I secure the maximum efficiency.

The coil-pipe means to which reference has been had may be of any desirable character, for example, it may, as shown, consist of a plurality of coiled members as 22. These members may be of any desirable number, and one of them is shown in detail in Fig. 4. The coiled member shown in said Fig. 4 is the innermost one represented in Fig. 3, and a description of the course taken by this innermost coiled member will apply to the other. Said innermost coiled member 22 is connected at its innermost terminal end, as shown at 23 in Fig. 3, with the upper head of the hot water chamber 13. The coiled member has an upward return bend and a downwardly-extending portion 24 which extends entirely through and below the adjacent steam pipe 17. The leg or portion 24 terminates at its lower end in an upward return bend 25 from which the upwardly-extending leg or branch 26 extends, said branch 26 being disposed within a second steam pipe 17 adjacent to the other steam pipe. The leg 26 terminates at its upper end in an upward return bend 27 which has a downwardly-extending leg 28 running through a third steam pipe 17, the leg 28 terminating at its lower end in a return bend 29 from which the upwardly extending leg 30 projects, said leg extending through a fourth steam pipe 17 and being connected at its upper end with the manifold 20. Each coil therefore has at its opposite ends return bends, the upper return bends being in the upper portion of the casing, while the lower return bends are in the space or compartment below the chamber 7, where they can be struck by the steam when it first enters the casing 5. The coil-pipe means to which reference has been had extends through the steam pipes 17 but is of less diameter than the latter, as shown clearly in Fig. 1 for example, so that the steam, as it passes through said pipe 17, travels in contact with said coil-pipe means throughout the entire length thereof, and can also come in contact with the return bends in the upper space of the casing.

I may provide on the lower return bends of the coiled members 22 blow-off pipes as 31, which pipes extend downward from said bends through the bottom of the casing 5 and are provided with cocks or valves as 32, by opening which the various coiled members can be blown out.

From the manifold 20 there depends the pipe 33 which extends downward entirely through the central steam pipe 17 and through the bottom of the casing, said blow-off pipe 33 below the casing being provided with a valve as 34 serving the same office as the valves 32.

What I claim is:

1. In a feed water heater, a casing, cold water and hot water chambers in said casing, the casing having a steam inlet at one side of the cold water chamber and a compartment to receive said steam, pipes for conducting water from the cold water to the hot water chamber, other pipes for conducting steam from said compartment and extending entirely through the first mentioned pipes but of less diameter than the latter, and coil-pipe means connected with the hot water chamber for conducting hot water therefrom, said coil-pipe means extending through and being of less diameter than the second series of pipes and being also extended into said compartment.

2. In a feed water heater, a casing, a cold water chamber in said casing separated from the bottom thereof to provide a lower space, the casing having an inlet for steam opening into said lower space, a hot water chamber in said casing separated from the top thereof to provide an upper space, pipes for conducting cold water from the cold water to the hot water chamber, a second series of pipes extending through the first mentioned series of pipes for conducting steam from the lower space to the upper space, said second series of pipes being of less diameter than the first mentioned series of pipes, and coil-pipe means connected with the hot water chamber, extending through the second mentioned series of pipes, and of less diameter than the latter, said coil-pipe means having portions disposed in said lower space.

3. In a feed water heater, a casing, cold water and hot water chamber in said casing, pipes for conducting water from the cold water to the hot water chamber, steam pipes extending through and of less diameter than said other pipes, and coil-pipe means of less diameter than and extending through said second series of pipes.

4. In a feed water heater, a casing, a cold water chamber in said casing separated from the bottom thereof to provide a lower space, the casing having a steam inlet opening into said lower space, a hot water chamber in the casing separated from the top thereof to provide an upper space, pipes for conducting the cold water from the cold water chamber to the hot water chamber, a second series of pipes extending through the first mentioned pipes and through the two chambers for conducting steam from the lower space to the upper space, said second series of pipes being of less diameter than the first series, a manifold in said upper space, and coil-pipe means connected with the hot water chamber and also with the manifold, said coil-pipe means extending through and being of less diameter than the second series of pipes and being disposed in part of said lower space.

5. In a feed water heater, a casing, a cold water chamber in said casing separated from the bottom thereof to provide a lower space, the casing having a steam inlet opening into said lower space, a hot water chamber in the casing separated from the top thereof to provide an upper space, pipes for conducting the cold water from the cold water chamber to the hot water chamber, a second series of pipes extending through the first mentioned series of pipes and through the two chambers for conducting steam from the lower space to the upper space, said second series of pipes being of less diameter than the first series, a manifold in said upper space, and coil-pipe means connected with the hot water chamber and also with the manifold, said coil-pipe means extending through and being of less diameter than the second series of pipes and being disposed in part of said lower space, said coil-pipe means having valved blow-off pipes extending therefrom and to a point outside the casing.

6. In a feed water heater, a casing, a cold water chamber in said casing separated from the bottom thereof to provide a lower space, the casing having a steam inlet opening into said space, a hot water chamber in said casing separated from the top thereof to provide an upper space, the external portion of the hot water chamber being separated from the casing, pipes for conducting water from the cold water to the hot water chamber, steam pipes leading from said lower space to said upper space, extending through the two chambers and through the first mentioned pipes, the second series of pipes being of less diameter than the first mentioned pipes, and coil-pipe means connected with the hot water chamber, extending through and of less diameter than the said steam pipes and being disposed in part of said lower space.

7. In a feed water heater, a casing, a cold water chamber in said casing, said chamber being separated from the bottom of the casing to provide a lower space, an oil skimming pipe extending through the bottom of the casing up into said space, a hot water chamber in said casing separated from the top thereof to provide an upper space, pipes for conducting cold water from the cold water to the hot water chamber, steam pipes extending from the lower to the upper space, through the two chambers, and through the first mentioned series of pipes; said second series of pipes being of less diameter than the first series, a manifold in the upper space, and coil-pipe means connected with the hot water chamber and with the manifold, extending through, and of less diameter than the said second series of pipes and disposed in part of said lower space.

8. In a feed water heater, a casing, a cold water chamber in said casing separated from the bottom thereof to provide a lower space, a hot water chamber in the casing separated from the top thereof to provide an upper space, pipes for conducting water from the space, pipes for conducting water from the cold water to the hot water chamber, steam pipes extending through and of less diameter than the first mentioned series of pipes for conducting steam from the lower to the upper space, a manifold in the upper space, and a plurality of coiled pipe members each connected at one end with the hot water chamber and at the other end with said manifold, the coiled pipe members between their ends extending into said lower space and through said second series of pipes but of less diameter than the latter.

9. In a feed water heater, a casing, a cold water chamber in said casing separated from the bottom thereof to provide a lower space, a hot water chamber in the casing separated from the top thereof to provide an upper space, pipes for conducting water from the cold water to the hot water chamber, steam pipes extending through and of less diameter than the first mentioned series of pipes for conducting steam from the lower to the upper space, a manifold in the upper space, a plurality of coiled pipe members each connected at one end with the hot water chamber and at the other end with said manifold, the coiled pipe members between their ends extending into said lower space and through said second series of pipes but of less diameter than the latter, and means for conducting condensates from the space between the two chambers.

10. In a feed water heater, a casing, a cold water chamber in said casing separated from the bottom thereof to provide a lower space, a hot water chamber in the casing separated from the top thereof to provide an upper space, pipes for conducting water from the cold water to the hot water chamber, steam pipes extending through and of less diameter than the first mentioned series of pipes for conducting steam from the lower to the upper space, a manifold in the upper space, a plurality of coiled pipe members each connected at one end with the hot water chamber and at the other end with said manifold, the coiled pipe members between their ends extending into said lower space and through said second series of pipes but of less diameter than the latter, and a pipe connecting the space between the two chambers with the lower space for conducting condensates from the former to the latter.

In testimony whereof I have hereunto set my hand in presence of two subscribing witnesses.

WILHELM GRIESSER.

Witnesses:
R. B. PETTY, Jr.,
W. F. PETTY.